United States Patent [19]

Cornwell

[11] Patent Number: 5,268,058
[45] Date of Patent: Dec. 7, 1993

[54] CRYTOPLATE SEAL BAR

[75] Inventor: James T. Cornwell, Cleveland, Tenn.

[73] Assignee: Quality Containers International, Inc., Crossett, Ark.

[21] Appl. No.: 27,914

[22] Filed: Mar. 8, 1993

Related U.S. Application Data

[63] Continuation of Ser. No. 825,157, Jan. 23, 1992, abandoned.

[51] Int. Cl.⁵ ............................................. B23K 37/00
[52] U.S. Cl. .................................. 156/583.1; 156/580; 156/581; 156/290; 53/376.6; 53/479; 53/375.9; 53/370.7; 493/197; 493/208; 493/212; 493/470
[58] Field of Search ............ 156/580, 581, 290, 583.1; 53/376.6, 479, 375.9, 370.7; 493/197, 212, 208, 470

[56] References Cited

U.S. PATENT DOCUMENTS

| | | | |
|---|---|---|---|
| 2,354,989 | 8/1944 | Fusco . | |
| 2,620,014 | 12/1952 | Lyijynen . | |
| 2,638,724 | 5/1953 | Harvey . | |
| 2,866,488 | 12/1958 | Thompson . | |
| 2,999,042 | 9/1961 | Meister . | |
| 3,200,687 | 8/1965 | Paulson | 53/346 |
| 3,367,810 | 2/1968 | Wasserstein | 156/88 |
| 3,468,096 | 9/1969 | Franz | 53/28 |
| 3,677,122 | 7/1972 | Raustine | 83/347 |
| 3,971,300 | 7/1976 | Bachner . | |
| 4,016,806 | 4/1977 | Schuster | 93/35 R |
| 4,019,947 | 4/1977 | Stock et al. | 493/197 |
| 4,048,003 | 9/1977 | Bolli | 156/515 |
| 4,070,513 | 1/1978 | Rhoads . | |
| 4,091,595 | 5/1978 | Pelster et al. | 53/187 |
| 4,117,306 | 9/1978 | Shah . | |
| 4,586,317 | 5/1986 | Bussell . | |
| 4,680,024 | 7/1987 | Focke et al. | 493/197 |
| 5,015,223 | 5/1991 | Boeckmann . | |
| 5,040,904 | 8/1991 | Cornwell | 587/71 |

*Primary Examiner*—Patrick J. Ryan
*Assistant Examiner*—Merrick Dixon
*Attorney, Agent, or Firm*—Notaro & Michalos

[57] ABSTRACT

A transverse seal bar produces triangular air pockets between straight, parallel transverse seals. providing stress supports as well as rigidity to the seal The seal is fail-proof and is applied to plastic or other materials laminated to plastic such as; aluminum, paper or metallized materials. The seal bar is adaptable to commercial bag seal machines or other such commercial sealing machines.

8 Claims, 2 Drawing Sheets

CRYTOPLATE SEAL BAR

This application is a continuation of application Ser. No. 07/825,157, filed Jan. 23, 1992, now abandoned.

BACKGROUND SUMMARY

1. Field of Invention

This invention relates to an apparatus for sealing containers for the purpose of collecting, containing, transporting and disposing of dental and medical infectious waste, hazardous/toxic and low/level radioactive waste and particularly to the fail-proof sealing of the bottom margins of the mentioned containers, of mono or co-extruded plastic, or materials laminated to plastic such as, paper, aluminum or metallized material. The said plastic is primarily polyethylene, but this invention's use is not limited to that of polyethylene.

2. Description of the Related Art

In 1989, over 20 million pounds of plastic, paper, aluminum and other metallic material, were used in packaging requiring some type of heat applied seal. Currently the process for sealing containers, consists of male and female seal bars as described below.

Sealing systems for resistance materials (barrier proof) employ heated, solid sealing dies, between $\frac{1}{4}''$ and $\frac{1}{2}''$ in width. These resistence materials are generaly single layer, co-extrusions of two or more layers, or laminations of several layers. When constantly heated, dies (male and female) are closed on the material with proper combination of time, temperature and pressure causing the material to be welded together (seal). Currently seals have a tendency to over heat due to their solid state, thus creating melt points along the web of the seal or where the male and female joint is faulted. These melt points are susceptible to failure resulting in leakage especially in a gusseted bag at points where the gusset is folded in the inner position of the gusset.

The following patents are relevant to the present invention:

| Patent | Patentee | Issued |
|--------|----------|--------|
| 2,354,989 | Fusco | Aug. 14, 1944 |
| 2,620,014 | Lyijynen | Dec. 2, 1952 |
| 2,638,724 | Harvey | May 19, 1953 |
| 2,866,488 | Thompson | Dec. 30, 1958 |
| 2,999,042 | Meister | Sept. 5, 1961 |
| 3,468,096 | Franz | Sept. 23, 1969 |
| 3,971,300 | Bachner | July 27, 1976 |
| 4,070,513 | Rhoads | Jan. 24, 1978 |
| 4,117,306 | Shah | Sept. 26, 1978 |
| 4,586,317 | Bussell | May 6, 1986 |
| 5,015,223 | Boeckmann | May 14, 1991 |

SUMMARY OF THE INVENTION

The present invention provides a fail-proof seal for application in packaging utilizing plastic, paper, metallic material, and/or aluminum material. Those materials have little or no heat-seal ability, but can be laminated with heat sealable layers usually polyethylene or polyethylene copolymers such as EVA, ionomer resins and heat sealable coating so that composite materials take maximum advantage of the properties of all the component parts.

This invention applies the fail-proof seal in the process mentioned below. As the plastic tubing is fed from its supply it passes through various rollers. This process is computer controlled so the plastic tubing stops after receiving a computer signal that in turn determines the container length. The thermostaticly heated upper servo controlled male seal bar of the invention descends as the plastic stops, merging with the thermostaticly heated lower or counter seal bar (flat surface). During this merging the seal of the invention is formed due to the fact that the upper and lower thermostatic controlled heat bars are heated to a definite temperature that during this precise merging time allows the material in the inside layer to be welded together. This creates a fail-proof seal. Laboratory tests prove that this fail-proof seal is superior in the tensile strength machined direction of 9500 psi versus the 6600 psi machine direction tensile strength of a leading competitor's seal.

The apparatus of the invention is designed to provide a fail-proof seal when thermostatically controlled heat is applied to the seal bar during a sealing cycle. The seal consists of a five way closure—horizontal left to right; horizontal right to left; vertical; 45 degrees right to left; and 45 degrees left to right. The seal bar is composed of two thermostatically heat controlled transverse master seal bars with recessed thermostatically heat controlled triangular air pockets positioned uniformily across the web of the bar.

The seal bar is machined from dura-bar continuous cast grey iron. It is mounted on an upper support bar to prevent deflection and provide the thermostatically controlled heat uniformily across the web of the bar. This upper support bar is attached to a commercial Cross Sealed Bag Machine which is servo-cam activated and cycle controlled. Thus, the seal bar is permanently stationary with constant uniform heat across the web. The seal bar is coated with a low stick material like TEFLON (a trademark) cloth to increase the operating life of the bar and to prevent the sealable material from sticking to the sealing surface. A lower support bar consists of a silicone pad which is mounted on a lower bar also attached to the commercial Cross Sealed Bag Machine.

The seal bar of the invention is applicable for sealing all gauges of flexable plastic or plastic laminated materials from 0.0003 mil to 48 mil thickness. Using plastic laminated material (aluminum, paper or metallic), the inner layer of the material is plastic to insure a viable, fail-proof seal. Temperatures and pressures are adjustable as to the material being sealed.

The seal bar of the invention is advantageous for making seals in heavy duty shipping sacks (plastic, or plastic and paper); packaging for pharmaceuticals or cosmetics; food packaging (plastic, multilayer plastic, plastic laminated paper, aluminum and metallic material); containment of toxic, infectious of hazardous materials; chemical products (solids, semi-solids or liquids); and squeezable tube packaging; pouches; anti-corrosive polyethylene films; add-on-closures; bag-in-box packaged products (wine, milk, juices and other liquids); and applications related to military, educational, and other institutional uses.

BRIEF DESCRIPTION OF THE DRAWINGS

The drawings represent the concept, and basic components of the thermostatic controlled heat seal apparatus of the invention, wherein.

DETAILED DESCRIPTION OF THE DRAWINGS

Figure 2:
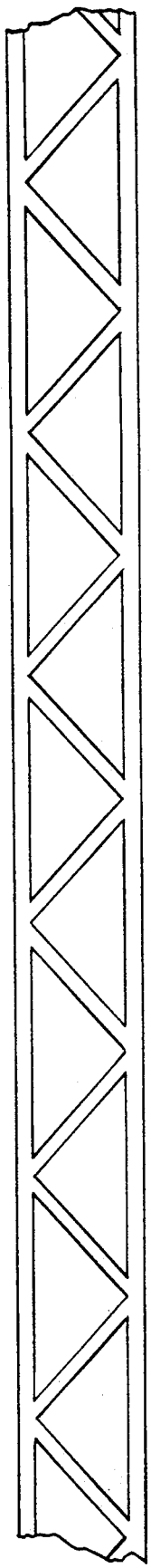
FIG. 2 is an illustration and configuration of the seal as it will appear on the sealed material after the seal cycle.

FIG. 2 is an illustration of the seal made with the apparatus of the invention and as it will appear on the sealed material after the transverse seal cycle.

Figure 1:
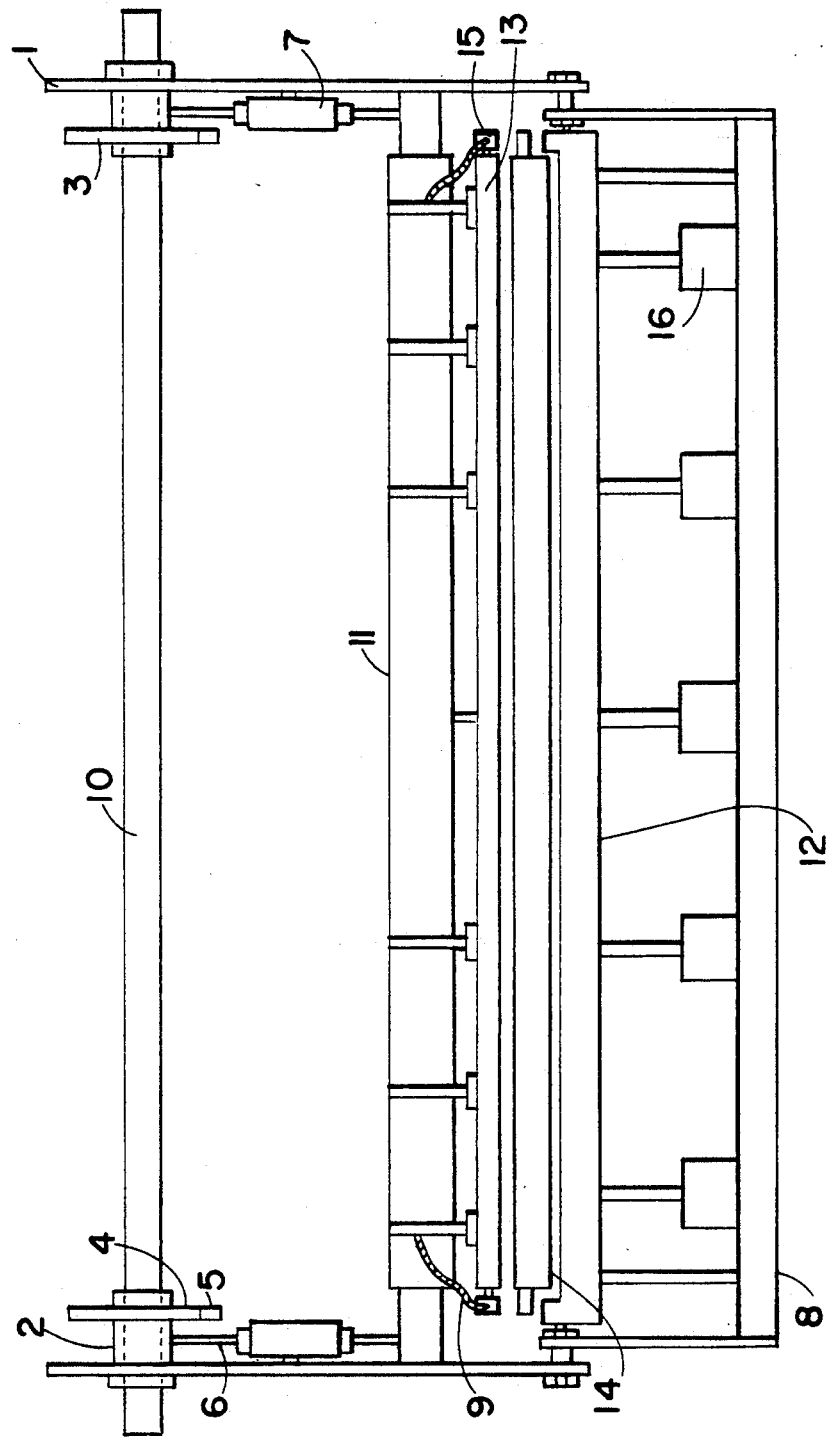
FIG. 1 is a side view of the apparatus of the invention.
Figure 3:
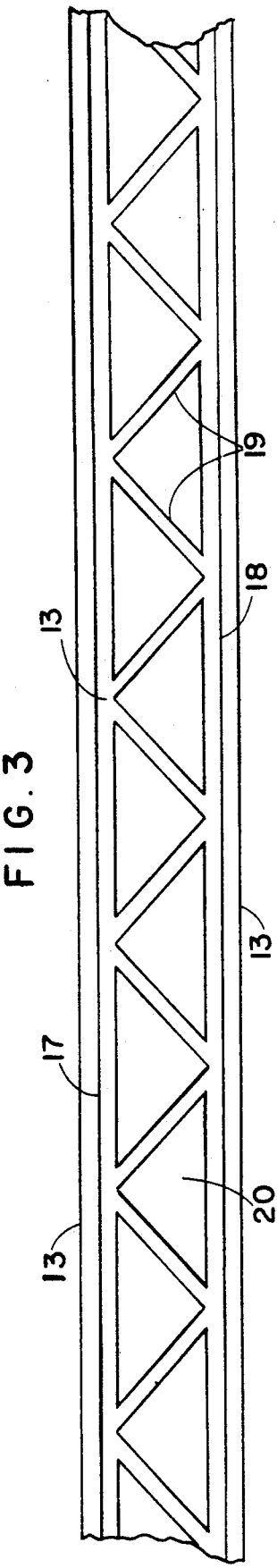
FIG. 3 is a cut out illustration of the seal bar.

FIG. 3 illustrates a seal bar 13 of the invention for installation on a conventional Cross Sealed Bag Machine. The conventional machine is shown in FIG. 1 and includes side frames 1 which are the outer structure which supports the total housing for the seal bar 13. The connecting shaft 10, supports the pulley 2, the cam 3, the cam follower 4, the bar cam 5, the push rod 6, the push rod housing 7 and the upper support bar 11 to which is attached the seal bar 13. When the servo motor attached to the Cross Sealed Bag Machine, is energized, the cam 3 and cam follower 4 drive the bar cam 5 to activate the push rod 6 through the push rod housing 7 which cycles the upper support bar 11 causing the seal bar 13 to move downward or upward during the sealing cycle.

The lower support bar 12 with a resilient silicone counter bar 14, is cycled in timing to move upward and engage the upper support bar 11 with the seal bar 13 to create the seal. The lower support bar 12 is driven by compressed air utilizing the pancake cylinders 16 mounted on the bottom assembly bar 8.

The thermostatically heat thermal connector 15, is attached to the seal bar 13 with electrical current supplied through thermal controlled wire 9 insuring a specified constant temperature level across the web of the seal bar 13. A constant pressure during the sealing cycle is maintained through adjustments on the pulley 2, the cam 3, the cam follower 4 and the cam push rod 6. FIG. 3 is an illustration of a section of the sealing surface of the seal bar 13 which can be machined in lengths up to 60 inches and widths between 3/16 of an inch and 2 inches. The upper straight transverse member 17 is connected to and parallel with the lower straight transverse member 18 by 45 degree angular straight members 19 forming triangular air pockets 20. Angular or angle members 19 extend at acute angles between the members 17 and 18, and form the triangular pockets 20 with the transverse members 17 and 18 by meeting the transverse members at the apex of each triangular pocket. The members 17, 18 and 19 are machined from dura-bar continuous cast gray iron.

I claim:

1. An apparatus for making a seal between two layers of material which are heat sealable to each other, comprising:
    a frame;
    a first support bar mounted to said frame;
    a second support bar mounted to said frame;
    a seal bar mounted to said first support bar and having a sealing surface facing said second support bar, said seal bar having, at said sealing surface thereof, a pair of straight parallel spaced apart transverse members and a plurality of angle members each extending at acute angle between said transverse members and defining with said transverse members a plurality of closed triangular pockets extending along said seal bar, two adjacent angle members forming each closed pocket, meeting at an apex of a respective closed triangular pocket, at one of said transverse members;
    thermostatic heating means operatively connected to said seal bar for heating said seal bar to a temperature sufficient to heat seal two layers of heat sealable material to each other;
    a counter bar mounted to said second support bar; and
    drive means operatively connected to said frame for moving said first and second support bars toward each other to form a seal in two layers of heat sealable material between said seal bar and said counter bar; said pair of transverse members being between about 3/16 of an inch and about 2 inches apart, said angle members each extend at an angle of about 45 degrees to said transverse members.

2. An apparatus according to claim 1, wherein said first support bar comprises an upper support bar mounted to said frame, said second support bar comprising a lower support bar.

3. An apparatus according to claim 2, wherein said counter bar has a sealing surface facing said first support bar, said sealing surface of said counter bar being substantially flat.

4. An apparatus according to claim 3, wherein at least one of the seal bar and counter bar have a low stick material coating thereon.

5. An apparatus according to claim 4, wherein the counter bar is resilient.

6. An apparatus according to claim 1, wherein said counter bar has a sealing surface facing said first support bar, said sealing surface of said counter bar being substantially flat.

7. An apparatus according to claim 1, wherein at least one of the seal bar and counter bar have a low stick material coating thereon.

8. An apparatus according to claim 1, wherein the counter bar is resilient.

* * * * *